US012574140B2

(12) United States Patent
Dong

(10) Patent No.: US 12,574,140 B2
(45) Date of Patent: Mar. 10, 2026

(54) COMMUNICATION METHOD AND COMMUNICATION DEVICE

(71) Applicant: Beijing Xiaomi Mobile Software Co., Ltd., Beijing (CN)

(72) Inventor: Xiandong Dong, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 340 days.

(21) Appl. No.: 18/036,533

(22) PCT Filed: Nov. 13, 2020

(86) PCT No.: PCT/CN2020/128784
§ 371 (c)(1),
(2) Date: May 11, 2023

(87) PCT Pub. No.: WO2022/099638
PCT Pub. Date: May 19, 2022

(65) Prior Publication Data
US 2023/0412301 A1 Dec. 21, 2023

(51) Int. Cl.
*H04L 1/00* (2006.01)

(52) U.S. Cl.
CPC .................................. *H04L 1/0005* (2013.01)

(58) Field of Classification Search
None
See application file for complete search history.

(56) References Cited

U.S. PATENT DOCUMENTS

| | | | |
|---|---|---|---|
| 8,971,167 B1 | 3/2015 | Srinivasa et al. | |
| 11,871,446 B2* | 1/2024 | Chen .................... | H04W 72/23 |

| | | | |
|---|---|---|---|
| 2013/0142095 A1* | 6/2013 | Calcev .................. | H04W 28/02 |
| | | | 370/311 |
| 2018/0124866 A1 | 5/2018 | Asterjadhi et al. | |
| 2019/0215205 A1 | 7/2019 | Kim et al. | |
| 2020/0162963 A1 | 5/2020 | Alpert et al. | |
| 2022/0104261 A1* | 3/2022 | Kwon .................. | H04W 48/16 |
| 2022/0345187 A1* | 10/2022 | Merlin ................. | H04B 7/0658 |

FOREIGN PATENT DOCUMENTS

| | | | | |
|---|---|---|---|---|
| CN | 103765804 B | 9/2017 | | |
| CN | 109716687 A | 5/2019 | | |
| CN | 109891788 A | 6/2019 | | |
| CN | 110730050 A | 1/2020 | | |
| CN | 111726193 A * | 9/2020 | .............. | H04L 1/06 |
| CN | 111901273 A | 11/2020 | | |
| CN | 111901280 A | 11/2020 | | |
| WO | 2019032216 A1 | 2/2019 | | |

OTHER PUBLICATIONS

Texas Instruments, "MCS and HARQ Bundling for Uplink SU-MIMO", 3GPP TSG RAN WG1 56bis,R1-091299,Seoul, Korea, Mar. 23-27, 2009.

* cited by examiner

*Primary Examiner* — Gerald A Smarth

(74) *Attorney, Agent, or Firm* — Volpe Koenig

(57) ABSTRACT

A communication method includes: determining a first message frame, the first message frame including information indicating a physical parameter, the physical parameter including a modulation and coding scheme (MCS) set supported by N spatial streams, in which N is a positive integer greater than 8; and performing communication between a transmission terminal and a reception terminal communicating based on the first message frame.

17 Claims, 5 Drawing Sheets

```
┌─────────────────────────────────────────────┐
│                                               │
│        Determine a first message frame        │ ⌇ 610
│                                               │
└─────────────────────────────────────────────┘
                      │
                      ▼
┌─────────────────────────────────────────────┐
│                                               │
│ Perform communication based on the first message frame │ ⌇ 620
│                                               │
└─────────────────────────────────────────────┘
```

| Rx HE-MCS Map ≤ 80 MHz | Tx HE-MCS Map ≤ 80 MHz | Rx HE-MCS Map 160 MHz | Tx HE-MCS Map 160 MHz | Rx HE-MCS Map 80+80 MHz | Tx HE-MCS Map 80+80 MHz |
|---|---|---|---|---|---|
| 2 | 2 | 0 or 2 | 0 or 2 | 0 or 2 | 0 or 2 |

(Octets):

| Max HE-MCS For 1 SS | Max HE-MCS For 2 SS | Max HE-MCS For 3 SS | Max HE-MCS For 4 SS | Max HE-MCS For 5 SS | Max HE-MCS For 6 SS | Max HE-MCS For 7 SS | Max HE-MCS For 8 SS |
|---|---|---|---|---|---|---|---|
| 2 | 2 | 2 | 2 | 2 | 2 | 2 | 2 |

(Bits):

Rx HE-MCS Map sub-field, Tx HE-MCS Map sub-field and format of Basic HE-MCS And NSS Set field

Fig. 4

| HE-MCS Index | DCM | Modulation | R | $N_{BPSCS}$ | $N_{SD}$ | $N_{CBPS}$ | $N_{DBPS}$ | Data Rate (Mb/s) 0.8 µs GI | 1.6 µs GI | 3.2 µs GI |
|---|---|---|---|---|---|---|---|---|---|---|
| 0 | 1 | BPSK | 1/2 | 1 | 12 | 12 | 6 | 0.4 | 0.4 | 0.4 |
| 0 | 0 | BPSK | 1/2 | 1 | 24 | 24 | 12 | 0.9 | 0.8 | 0.8 |
| 1 | 1 | QPSK | 1/2 | 2 | 12 | 24 | 12 | 0.9 | 0.9 | 0.8 |
| 1 | 0 | QPSK | 1/2 | 2 | 24 | 48 | 24 | 1.8 | 1.7 | 1.5 |
| 2 | N/A | QPSK | 3/4 | 2 | 24 | 48 | 36 | 2.6 | 2.5 | 2.3 |
| 3 | 1 | 16-QAM | 1/2 | 4 | 12 | 48 | 24 | 1.8 | 1.7 | 1.5 |
| 3 | 0 | 16-QAM | 1/2 | 4 | 24 | 96 | 48 | 3.5 | 3.3 | 3.0 |
| 4 | 1 | 16-QAM | 3/4 | 4 | 12 | 48 | 36 | 2.6 | 2.5 | 2.3 |
| 4 | 0 | 16-QAM | 3/4 | 4 | 24 | 96 | 72 | 5.3 | 5.0 | 4.5 |
| 5 | N/A | 64-QAM | 2/3 | 6 | 24 | 144 | 96 | 7.1 | 6.7 | 6.0 |
| 6 | N/A | 64-QAM | 3/4 | 6 | 24 | 144 | 108 | 7.9 | 7.5 | 6.8 |
| 7 | N/A | 64-QAM | 5/6 | 6 | 24 | 144 | 120 | 8.8 | 8.3 | 7.5 |
| 8 | N/A | 256-QAM | 3/4 | 8 | 24 | 192 | 144 | 10.6 | 10.0 | 9.0 |
| 9 | N/A | 256-QAM | 5/6 | 8 | 24 | 192 | 160 | 11.8 | 11.1 | 10.0 |
| 10 | N/A | 1024-QAM | 3/4 | 10 | 24 | 240 | 180 | 13.2 | 12.5 | 11.3 |
| 11 | N/A | 1024-QAM | 5/6 | 10 | 24 | 240 | 200 | 14.7 | 13.9 | 12.5 |

Determine a first message frame — 610

Perform communication based on the first message frame — 620

Communication device 700

| Processing module 710 | Communication module 720 |

Fig. 7

COMMUNICATION METHOD AND COMMUNICATION DEVICE

CROSS REFERENCE TO RELATED APPLICATION

The present application is a U.S. National Stage of International Application No. PCT/CN2020/128784, filed on Nov. 13, 2020, the contents of all of which are incorporated herein by reference in their entirety for all purposes.

BACKGROUND

The task group (TG) IEEE 802.11be, founded by the Institute of Electrical and Electronic Engineers (IEEE), has been engaged in the study of a next generation (IEEE 802.11a/b/g/n/ac) Wi-Fi technology. The study scope involves 320 MHz-bandwidth transmission, aggregation and coordination of a number of frequency bands, etc., and is expected to improve the rate and throughput at least four times compared with the existing IEEE 802.11ax standard, its main application scenarios are video transmission, augmented reality (AR), virtual reality (VR), etc.

SUMMARY

All examples of the disclosure provide the technical solutions as follows.

An example of the disclosure provides a communication method. The communication method includes: determining a first message frame, the first message frame including information indicating a physical parameter, the physical parameter including a modulation and coding scheme (MCS) set supported by N spatial streams, in which N is a positive integer greater than 8; and performing communication between a transmission terminal and a reception terminal based on the first message frame.

An example of the disclosure provides an electronic device. The electronic device includes a memory, a processor, and a computer program stored on the memory and runnable by the processor, in which the processor implements the above method when executing the computer program.

An example of the disclosure provides a non-transitory computer-readable storage medium, storing a computer program, in which the computer program implements the above method when executed by a processor.

BRIEF DESCRIPTION OF THE DRAWINGS

The above and other features in examples of the disclosure will be more apparent by describing the examples of the disclosure in detail with reference to the accompanying drawings.

FIG. 3 is a schematic diagram of a supported HE-modulation and coding scheme (MCS) and a number of spatial stream (NSS) set;

FIG. 4 is a schematic diagram of carried information about a modulation and coding scheme;

FIG. 7 is a block diagram of a communication device according to an example of the disclosure.

DETAILED DESCRIPTION

Figure 1:
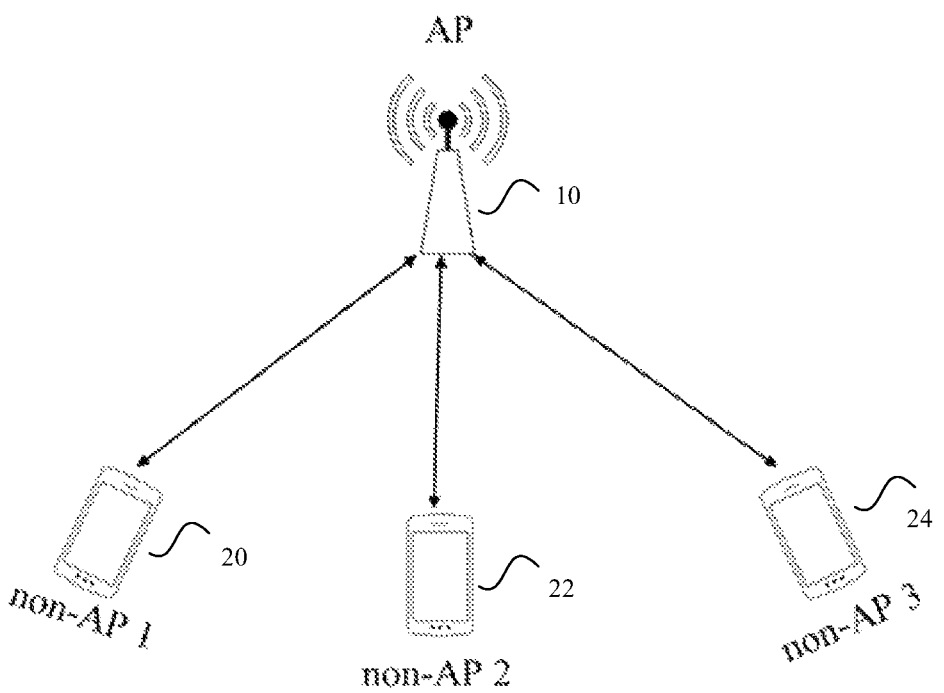
FIG. 1 is an illustrative schematic diagram of a wireless communication scenario.

The description made with reference to the accompanying drawings is provided below to assist in a comprehensive understanding of all examples of the disclosure as defined by the appended claims and their equivalents. All the examples of the disclosure include various specific details, but these details are merely deemed illustrative. In addition, the description of well-known technologies, functions, and constructions can be omitted for the sake of clarity and conciseness.

The terms and words used in the disclosure are not limited to the literary meanings, but are merely used by the inventors to enable a clear and consistent understanding of the disclosure. Accordingly, for those skilled in the art, the description of all the examples of the disclosure is provided for the purpose of illustration rather than limitation.

It should be understood that unless otherwise clearly stated in the context, the singular forms such as "a", "an", "the", and "this" used here also include the plural forms. It should be further understood that the words "comprise" and "include" used in the disclosure specify the presence of the described features, integers, steps, operations, elements, and/or assemblies, but do not exclude the presence or addition of one or more other features, integers, steps, operations, elements, assemblies, and/or their groups.

It is to be understood that while the terms "first", "second", etc. can be used to describe various elements here, these elements should not be limited to this. These terms are merely used to distinguish one element from another element. Accordingly, a first element discussed below can be referred to as a second element without departing from the teachings in the examples.

It should be understood that when referred to as being "connected" or "coupled" to another element, an element can be directly connected or coupled to another element or through an intermediate element. In addition, "connected" or "coupled" used here can include wirelessly connected or wirelessly coupled. The term "and/or" or the expression "at least one of/at least one" used here includes one or any and all combinations of a plurality of associated items listed.

Unless otherwise defined, all the terms (including technical terms and scientific terms) used here have ordinary meanings understood by those of ordinary skill in the art to which the disclosure belongs.

In the related technical solution, the aggregation and coordination of a number of frequency bands refers to simultaneous communication between devices in the frequency bands of 2.4 GHz, 5.8 GHz, and 6 Ghz-7 GHz. The simultaneous communication between devices in multiple frequency bands has to be managed with a new media access control (MAC) mechanism. In addition, it is also intended that low-delay transmission be supported in the IEEE 802.11be.

Upon the discussion of the IEEE802.11be standard, the maximum bandwidth of 320 MHz (160 MHz+160 MHz) will be supported, while 240 MHz (160 MHz+80 MHz) and the bandwidth supported in the IEEE802.11ax standard will probably be supported.

In the IEEE802.11be standard, a modulation mode of 4K quadrature amplitude modulation (QAM), i.e., 4096 QAM, and more spatial streams (SSs) than 8 spatial streams in the IEEE802.11ax standard, for example, 16 space time streams or spatial streams, will be additionally supported. But such a modulation mode and spatial streams can hardly be supported in the existing standard.

In addition, since the bandwidth of 320 MHz (160 MHz+ 160 MHz) and 16*16 multiple input multiple output (MIMO) will be supported in the IEEE802.11be standard, the existing standard fails to identify the physical parameter supported by the IEEE802.11be standard.

As for this, the disclosure provides a technical solution related to the field of communication, and in particular to a communication method and a communication device in wireless communication.

FIG. 1 is an illustrative schematic diagram of a wireless communication scenario.

In a wireless local area network, a basic service set (BSS) can be composed of a station (STA). The STA can include an access point (AP) device 10 and one or more non-AP devices 20, 22, 24 that communicate with the AP device 10. One basic service set can be connected to a distribution system (DS) through its AP device 10, and then connected into another basic service set to form an extended service set (ESS).

The AP device 10 is a wireless switch for a wireless network and is also a core of wireless network. The AP device 10 can be used as a wireless base station and mainly serves as a bridge for connecting the wireless network and a wired network. With such an AP device 10, the wired network and the wireless network can be integrated.

Illustratively, the AP device 10 can include a software application and/or circuit to enable other types of nodes in the wireless network to communicate with the outside and the inside of the wireless network through the AP. For example, the AP device 10 can be a terminal device or network device configured with a wireless fidelity (Wi-Fi) chip.

Illustratively, the non-AP devices 20, 22, 24 can include, but are not limited to, a cellular phone, a smart phone, a wearable device, a computer, a personal digital assistant (PDA), a personal communication system (PCS) device, a personal information manager (PIM), a personal navigation device (PND), a global positioning system, a multimedia device, an Internet of Things (IoT) device, etc.

Although FIG. 1 shows that one AP device 10 communicates with three non-AP devices (non-AP 1 20, non-AP 2 22, and non-AP 3 24), which is merely illustrative and does not limit the examples of the disclosure. For example, any numbers and any types of AP devices and non-AP devices may be provided.

In an existing standard (e.g., the IEEE 802.11ax standard), a high efficiency (HE) operation element may identify a physical parameter supported by the device in the IEEE 802.11ax standard. A format of the HE operation element may be shown as 200 in FIG. 2.

Figure 2:
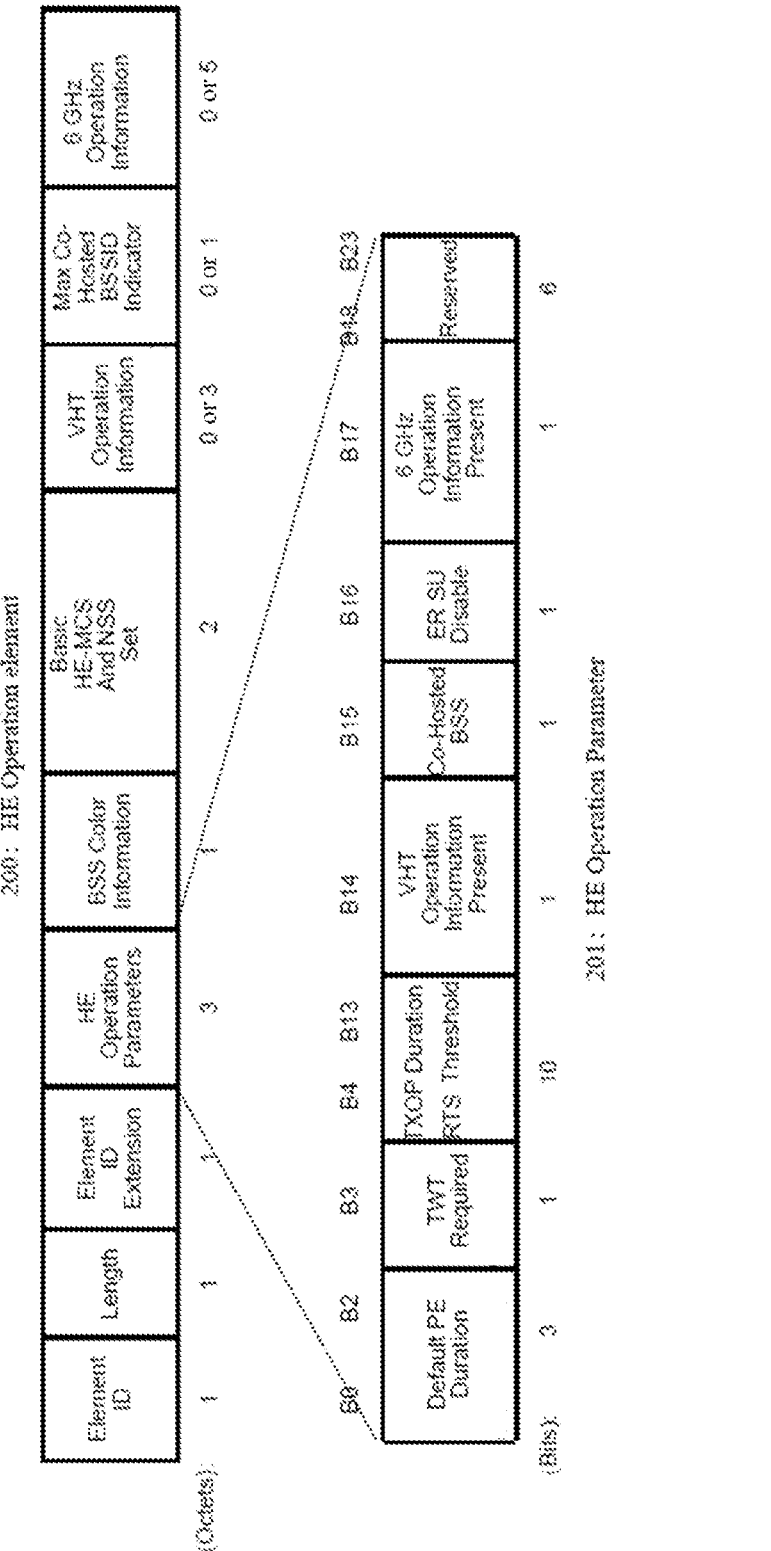
FIG. 2 is a schematic diagram of a format of a high efficiency (HE) operation element.

In the HE operation element 200 in FIG. 2, whether operation information on a standard before the IEEE 802.11ax standard is present may be indicated through an HE operation parameter field 201. For example, very high throughput (VHT) operation information present is indicated in the HE operation parameter field 201.

In addition, a supported HE-MCS and a number of spatial stream (NSS) set is further defined in the IEEE 802.11ax standard, so as to indicate an HE-MCS and spatial stream set for reception and transmission supported by the STA. FIG. 3 is a schematic diagram of a format of a supported HE-MCS and NSS set.

In the IEEE802.11 ax standard, information on a modulation and coding scheme may be carried by a basic HE-MCS and NSS set field in the HE operation element 200 shown in FIG. 2 or each sub-field of the supported HE-MCS and NSS set in FIG. 3. FIG. 4 is a schematic diagram of a format of carried information.

In FIG. 4, a max HE-MCS for n SS (n=1, . . . , 8) of each sub-field may be coded as follows:

0 indicates support for HE-MCSs 0-7 for n spatial streams;

1 indicates support for HE-MCSs 0-9 for n spatial streams;

2 indicates support for HE-MCSs 0-11 for n spatial streams; and 3 indicates that n spatial streams are not supported for HE presentation protocol data units (PPDUs).

Figures 5, 6:
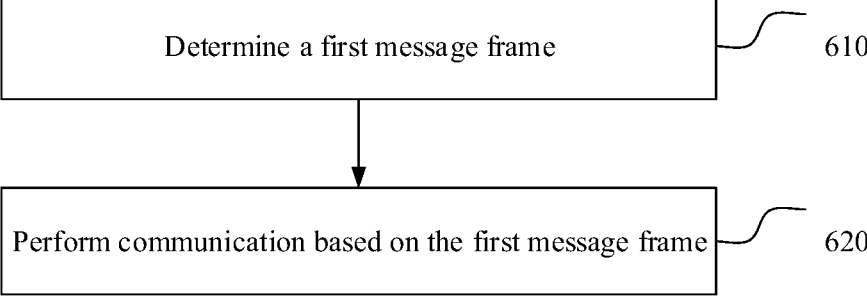
FIG. 5 shows an instance of information including a modulation mode, a coding rate, etc. corresponding to an HE-MCS.
FIG. 6 is a flowchart of a communication method according to an example of the disclosure.

In different resource units, HE-MCSs 0-11 may correspond to different modulation modes and coding rates. FIG. 5 shows information including a modulation mode and a coding rate corresponding to a 26-tone (sub-carrier) HE-MCS.

With reference to FIGS. 2-5, it may be seen that it is impossible for a mechanism of the existing standard to satisfy the demands of 4096 QAM, more spatial streams (for example, 16 spatial streams), a bandwidth of 320 MHz (160 MHz+160 MHz), etc., which will be supported in the IEEE802.11ax standard.

FIG. 6 is a flowchart of a communication method according to an example of the disclosure. The communication method shown in FIG. 6 may be performed by any STA in the BSS, that is, any AP device or non-AP device.

With reference to FIG. 6, in step 610, a first message frame may be determined. In the example of the disclosure, the first message frame may be determined in various ways. For example, the STA may generate the first message frame according to at least one of the following: a network condition, a load condition, a hardware capacity of a transmitting/receiving device, a service type, or relevant protocol provisions, which will not be limited in the example of the disclosure. In the example of the disclosure, the STA may acquire the first message frame from an external device, which will not be limited in the example of the disclosure.

The first message frame may be a management frame, a data frame, or a control frame capable of carrying various information and/or data, which will not be limited in the example of the disclosure.

In order to satisfy the 4096 QAM, more spatial streams (for example, 16 spatial streams), the bandwidth of 320 MHz (160 MHz+160 MHz) bandwidth, and/or 16*16 MIMO, which will be supported in the IEEE 802.11be standard, in the example of the disclosure, contents in the first message frame is re-defined to satisfy the demands of the IEEE 802.11be standard.

In the example of the disclosure, for convenience of description, the 4096 QAM may be defined through R=3/4 and R=5/6 (R: coding rate), indices of a modulation and coding scheme (MCS) corresponding to the 4096 QAM may be 12 and 13. However, such an arrangement is merely illustrative, and does not limit the example of the disclosure.

According to the example of the disclosure, the first message frame may include information indicating a physical parameter. The physical parameter may include a modulation and coding scheme (MCS) set supported by N spatial streams, in which N is a positive integer greater than 8. For convenience of description, the description is made with N=16 as an example. That is, the first message frame according to the example of the disclosure may satisfy the 16 spatial streams that may be supported in the IEEE802.11be standard.

According to the example of the disclosure, the modulation and coding scheme (MCS) set may include an MCS corresponding to a modulation and coding mode of the 4096-QAM. As an instance, indices of the MCS corresponding to the modulation and coding mode of the 4096-QAM may be 12 and 13.

According to the example of the disclosure, the modulation and coding scheme (MCS) set includes MCSs corresponding to modulation and coding modes of quadrature phase shift keying (QPSK), 16-QAM, 64-QAM, 256-QAM, and/or 1024-QAM. Illustratively, indices of the MCS corresponding to the modulation and coding modes of the QPSK, 16-QAM, 64-QAM, 256-QAM, and/or 1024-QAM may range from 0 to 11.

It is to be understood that the indices 0-13 in the above example are merely illustrative, and do not limit the disclosure. Other indices applicable to all the modulation and coding modes are also feasible.

When the example of the disclosure is described, the modulation and coding scheme (MCS) may be referred to as an extremely high-throughput (EHT)-MCS, that is, EHT-MCS. With reference to the above description on the indices, the modulation and coding scheme (MCS) set may include at least one of EHT-MCSs 0-13.

All information indicating a physical parameter in the first message frame will be described in detail below.

According to the example of the disclosure, the first message frame may include an extremely high-throughput operation element (EHT operation element) to identify a physical parameter of the STA. In an instance of the disclosure, a format of the extremely high-throughput operation element (EHT operation element) may be as shown in Table 1 below:

With reference to Table 2, the basic EHT-MCS and NSS set field of the extremely high-throughput operation element may include a plurality of first sub-fields (for example, "Max EHT MCS for 1 SS" to "Max EHT MCS for 16 SS" in Table 2), to be configured to identify a maximum (max) EHT-MCS set supported by n spatial streams, where n=1, . . . , N (N=16). In the example of the disclosure, each sub-field of the plurality of first sub-fields may include at least three bits. A coded value of each sub-field may represent any of the following:

a first value indicates support for EHT-MCSs 0-7 for n spatial streams;

a second value indicates support for EHT-MCSs 0-9 for n spatial streams;

a third value indicates support for EHT-MCSs 0-11 for n spatial streams;

a fourth value indicates support for EHT-MCSs 0-13 for n spatial streams; or a fifth value indicates that n spatial streams are not supported for EHT PPDUs.

In an instance, the first value may be 0, the second value may be 1, the third value may be 2, the fourth value may be 3, and the fifth value may be 4. However, such an arrangement is merely illustrative, and does not limit the disclosure. Other values are also feasible.

It may be understood that each element in the table of the disclosure exists independently, and these elements are illustratively listed in the same table. However, it does not mean that all the elements in the table must exist at the same time as shown in the table. A value of each element is independent of a value of any other element in Table 1. Thus, those skilled in the art may understand that the value of each element in the table of the disclosure is an independent example.

According to the example of the disclosure, physical parameters on more spatial streams (N=16) may be identified through a newly-defined extremely high-throughput

TABLE 1

| | | | | | | | | |
|---|---|---|---|---|---|---|---|---|
| Format of EHT operation element | | | | | | | | |
| Element ID (Identifier) | Length | Element ID Extension | EHT Operation Parameters | . . . | Basic EHT-MCS And NSS Set | HE Operation Information | VHT Operation Information | . . . |

Contents in the EHT operation element shown in Table 1 are merely illustrative, and do not limit the example of the disclosure. For example, the EHT operation element may further include a 6 GHz operation information field, etc.

In Table 1, the element identifier, the length, the element ID extension, etc. may have the similar meanings as in the existing standard. For the sake of conciseness, unnecessary description will be omitted here.

According to the example of the disclosure, the extremely high-throughput operation element shown in Table 1 may include a basic EHT-MCS and NSS set field, as shown in Table 2 below:

operation element (in particular, the basic EHT-MCS and NSS set field). Identified information includes EHT-MCS 12 and EHT-MCS 13 corresponding to the 4096-QAM (that is, supporting the 4096-QAM), so as to satisfy the demands of the IEEE 802.11be standard.

Alternatively, the extremely high-throughput operation element shown in Table 1 may include an EHT operation parameter field configured to indicate the presence of an operation parameter under the existing standard.

In an example, the EHT operation parameter field may include a first identifier (for example, HE operation parameter present) configured to indicate whether a high efficiency

TABLE 2

| | | | | | |
|---|---|---|---|---|---|
| Basic EHT-MCS And NSS Set | | | | | |
| Max EHT MCS for 1 SS (spatial stream) | Max EHT MCS for 2 SS | . . . | Max EHT MCS for 8 SS | Max EHT MCS for 9 SS | . . . Max EHT MCS for 16 SS |

(HE) operation parameter sub-field is present. As an instance, when the first identifier (the HE operation parameter present) is set as "1", the EHT operation element shown in Table 1 may include the HE operation parameter sub-field (that is, the number of bytes of HE operation information in Table 1 does not equal 0). When the first identifier (the HE operation parameter present) is set as "0", the EHT operation element shown in Table 1 does not include the HE operation parameter sub-field (that is, the number of bytes of HE operation information in Table 1 equals to 0).

Alternatively, the EHT operation parameter field may include a second identifier (for example, VHT operation parameter present) configured to indicate whether a very high throughput (VHT) operation parameter sub-field is present. As an instance, when the second identifier (the VHT operation parameter present) is set as "1", the EHT operation element shown in Table 1 includes the VHT operation parameter sub-field (that is, the number of bytes of VHT operation information in Table 1 does not equal 0). When the second identifier (the VHT operation parameter present) is set as "0", the EHT operation element shown in Table 1 does not include the VHT operation parameter sub-field (that is, the number of bytes of VHT operation information in Table 1 equals to 0).

According to the example of the disclosure, the first message frame may include a supported EHT MCS and NSS set sub-field configured to identify the physical parameter of the STA, of which a format may be as shown in Table 3 below.

transmit EHT-MCS map corresponding to the bandwidth less than or equal to 80 MHz (Tx EHT-MCS Map≤80 MHz);

receive EHT-MCS map corresponding to the bandwidth of 160 MHz (Rx EHT-MCS Map 160 MHz);

transmit EHT-MCS map corresponding to the bandwidth of 160 MHz (Tx EHT-MCS Map 160 MHz);

receive EHT-MCS map corresponding to the bandwidth of 80 MHz+80 MHz (Rx EHT-MCS Map 80 MHz+80 MHz); or transmit EHT-MCS map corresponding to the bandwidth of 80 MHz+80 MHz (Tx EHT-MCS Map 80 MHz+80 MHz).

As an instance, each second sub-field of the supported EHT-MCS and NSS set sub-field shown in Table 3 may have a format as shown in Table 2 above. That is, each second sub-field shown in Table 3 may include the plurality of first sub-fields shown in Table 2, and repetitions will be omitted here for the sake of conciseness.

In one example of the disclosure, the supported EHT-MCS and NSS set sub-field in Table 3 may be carried in the extremely high-throughput operation element shown in Table 1. In another example of the disclosure, the supported EHT-MCS and NSS set sub-field in Table 3 may not be carried in the extremely high-throughput operation element shown in Table 1, and be carried in another information element (for example, an EHT capacity information element) of the first message frame, or directly carried in the first message frame as a separate information element.

TABLE 3

| Supported EHT-MCS And NSS Set | | | | | | | | | |
|---|---|---|---|---|---|---|---|---|---|
| Rx EHT-MCS Map ≤ 80 MHz | Tx EHT-MCS Map ≤ 80 MHz | Rx EHT-MCS Map 160 MHz | Tx EHT-MCS Map 160 MHz | Rx EHT-MCS Map 80 + 80 MHz | Tx EHT-MCS Map 80 + 80 MHz | Rx EHT-MCS Map 320 MHz | Tx EHT-MCS Map 320 MHz | Rx EHT-MCS Map 160 + 160 MHz | Tx EHT-MCS Map 160 + 160 MHz |

With reference to Table 3, the supported EHT-MCS and NSS set sub-field according to the example of the disclosure may include a physical parameter/physical parameters of a bandwidth/bandwidths of 320 MHz/160 MHz+160 MHz. That is, the supported EHT-MCS and NSS set sub-field may include a second sub-field indicating at least one of the following:

receive EHT-MCS map corresponding to the bandwidth of 320 MHz (Rx EHT-MCS Map 320 MHz);

transmit EHT-MCS map corresponding to the bandwidth of 320 MHz (Tx EHT-MCS Map 320 MHz);

receive EHT-MCS map corresponding to the bandwidth of 160 MHz+160 MHz (Rx EHT-MCS Map 160 MHz+160 MHz); or transmit EHT-MCS map corresponding to the bandwidth of 160 MHz+160 MHz (Tx EHT-MCS Map 160 MHz+160 MHz).

In addition, with reference to Table 3, the supported EHT-MCS and NSS set sub-field according to the example of the disclosure may further include physical parameters of a bandwidth less than or equal to 80 MHz, a bandwidth of 160 MHz, or a bandwidth of 80 MHz+80 MHz. That is, the supported EHT-MCS and NSS set sub-field includes a second sub-field indicating at least one of the following:

receive EHT-MCS map corresponding to the bandwidth less than or equal to 80 MHz (Rx EHT-MCS Map≤80 MHz);

It is to be understood that the first message frame may carry at least one of the extremely high-throughput operation element in Table 1 or the supported EHT-MCS and NSS set sub-field in Table 3, which may be determined based on a hardware condition of the STA.

It may be understood that each element in the table of the disclosure exists independently, and these elements are illustratively listed in the same table. However, it does not mean that all the elements in the table must exist at the same time as shown in the table. A value of each element is independent of a value of any other element in Table 1. Thus, those skilled in the art may understand that the value of each element in the table of the disclosure is an independent example.

In some examples, a new extremely high-throughput operation element (EHT operation element) may be defined, which at least includes the following information:

an EHT operation parameter field if the EHT operation element is required to be compatible with the IEEE 802.11ax standard. In this field, at least one bit is configured to identify whether EHT operation element includes the HE (IEEE802.11ax) operation parameter. For example, when an HE operation parameter present field is set as "1", it is identified that the EHT operation element includes an HE operation parameter field. When an HE operation parameter present field is set as "0", it is identified that the EHT operation element does not include an HE operation parameter field.

Alternatively, one bit may also be configured to identify whether the EHT operation element includes a VHT (IEEE802.11ac) operation parameter field, of which an identification method is consistent with the above-described.

In some examples, the EHT operation element may further include a basic MCS and NSS set field.

Since MCS 12 and MCS 13 as well as a 16 space time stream (STS) are supported in the IEEE802.11be standard, it is required to make a new definition for this field, of which a format may be as shown in Table 2 above. As an instance, each field shown in Table 2 may further include 3 bits, which may be as follows in some examples:

0 indicates support for EHT-MCSs 0-7 for n spatial streams;

−1 indicates support for EHT-MCSs 0-9 for n spatial streams;

−2 indicates support for EHT-MCSs 0-11 for n spatial streams;

−3 indicates support for EHT-MCSs 0-13 for n spatial streams; or

−4 indicates that n spatial streams are not supported for EHT PPDUs.

In some examples, the supported EHT-MCS and NSS set may be re-designed.

Since the maximum bandwidth in the IEEE 802.11be is 320 MHz, this field is required to be re-designed, of which a format may be as shown in Table 3 above illustratively. It is to be understood that an information field for 320 MHz in Table 3 may not exist constantly (the AP and the non-AP support different physical parameters).

Return to FIG. 6 for reference, in step 620, a transmission terminal may communicate with a reception terminal based on the first message frame. For example, when the communication method shown in FIG. 6 is performed by the AP device serving as the transmission terminal, the AP device may determine the first message frame in step 610, and transmit the determined first message frame to the non-AP device. Correspondingly, the non-AP device may receive the first message frame, so as to acquire the physical parameter of the AP device based on the first message frame. For example, when the communication method shown in FIG. 6 is performed by the non-AP device serving as the transmission terminal, the non-AP device may determine the first message frame in step 610, and transmit the determined first message frame to the AP device. Correspondingly, the AP device may receive the first message frame, so as to acquire the physical parameter of the non-AP device based on the first message frame.

The communication method described with reference to FIG. 6 and the first message frame described in Tables 1-3 may satisfy the demands of the IEEE 802.11be standard, and improve the utilization efficiency of the frequency spectrum and throughput.

Figure 7:
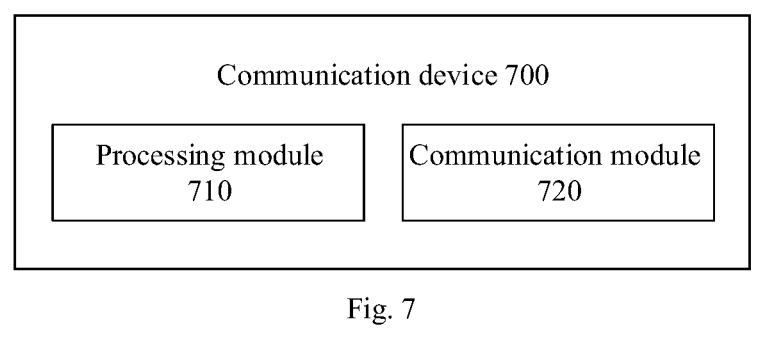

FIG. 7 is a block diagram of a communication device according to an example of the disclosure. The communication device 700 shown in FIG. 7 may be performed by any STA in the BSS, that is, any AP device or non-AP device.

With reference to FIG. 7, the communication device 700 may include a processing module 710 and a transmitting module 720. The processing module 710 may be configured to determine a first message frame. The first message frame may include information indicating a physical parameter, the physical parameter including a modulation and coding scheme (MCS) set supported by N spatial streams, in which N is a positive integer greater than 8. In some examples, N equals to 16. The transmitting module 720 may be configured to perform communication based on the first message frame.

According to the example, the modulation and coding scheme (MCS) set includes an MCS corresponding to a modulation and coding mode of 4096-QAM.

According to the example, indices of the MCS corresponding to the modulation and coding mode of the 4096-QAM are 12 and 13.

According to the example, the modulation and coding scheme (MCS) set includes MCSs corresponding to modulation and coding modes of QPSK, 16-QAM, 64-QAM, 256-QAM, and/or 1024-QAM.

According to the example, indices of the MCS range from 0 to 11. The MCS is an extremely high-throughput-modulation and coding scheme (EHT-MCS).

According to the example, the first message frame includes a plurality of first sub-fields, the plurality of first sub-fields identifying a maximum (max) EHT-MCS set supported by n spatial streams, in which n=1, . . . , N.

According to the example, each first sub-field includes at least three bits.

According to the example, a coded value of each first sub-field represents any of the following:

a first value indicates support for EHT-MCSs 0-7 for n spatial streams;

a second value indicates support for EHT-MCSs 0-9 for n spatial streams;

a third value indicates support for EHT-MCSs 0-11 for n spatial streams;

a fourth value indicates support for EHT-MCSs 0-13 for n spatial streams; or a fifth value indicates that n spatial streams are not supported for EHT PPDUs.

According to the example, the first message frame includes: an extremely high-throughput operation element.

According to the example, the extremely high-throughput operation element includes the plurality of first sub-fields.

According to the example, the extremely high-throughput operation element includes an extremely high-throughput operation parameter field.

According to the example, the extremely high-throughput operation parameter field includes a first identifier configured to indicate whether a high efficiency (HE) operation parameter sub-field is present.

According to the example, the extremely high-throughput operation parameter field includes a second identifier configured to indicate whether a very high throughput (VHT) operation parameter sub-field is present.

According to the example, the first message frame includes: a supported EHT-MCS and NSS set sub-field.

According to the example, the supported EHT-MCS and NSS set sub-field includes a second sub-field indicating at least one of the following:

receive EHT-MCS map corresponding to a bandwidth of 320 MHz;

transmit EHT-MCS map corresponding to the bandwidth of 320 MHz;

receive EHT-MCS map corresponding to a bandwidth of 160 MHz+160 MHz; or transmit EHT-MCS map corresponding to the bandwidth of 160 MHz+160 MHz.

According to the example, the supported EHT-MCS and NSS set sub-field includes a second sub-field indicating at least one of the following:

receive EHT-MCS map corresponding to a bandwidth less than or equal to 80 MHz;

transmit EHT-MCS map corresponding to the bandwidth less than or equal to 80 MHz;

receive EHT-MCS map corresponding to a bandwidth of 160 MHz;

transmit EHT-MCS map corresponding to the bandwidth of 160 MHz;

receive EHT-MCS map corresponding to a bandwidth of 80 MHz+80 MHz; or transmit EHT-MCS map corresponding to the bandwidth of 80 MHz+80 MHz.

According to the example, each second sub-field includes the plurality of first sub-fields.

The detailed description of the first message frame may be similar to the descriptions in step 610 described with reference to FIG. 6 and Tables 1-3, and repetitions will be omitted here for the sake of conciseness.

The communication device 700 may execute the communication method described with reference to FIG. 6, and repetitions will be omitted here for the sake of conciseness. In addition, the communication device 700 shown in FIG. 7 is merely illustrative, and does not limit the example of the disclosure. For example, the communication device 700 may further include other modules, for example, a memory module, etc. In addition, all the modules in the communication device 700 may be combined into more complex modules or divided into more separate modules to support various functions.

When the communication device shown in FIG. 7 is performed by the AP device serving as the transmission terminal, the processing module 710 may determine the first message frame and control the communication module 720 to transmit the determined first message frame to the non-AP device. Correspondingly, the non-AP device may receive the first message frame, so as to acquire the physical parameter of the AP device based on the first message frame. When the communication device shown in FIG. 7 is performed by the non-AP device serving as the transmission terminal, the processing module 710 may determine the first message frame and control the communication module 720 to transmit the determined first message frame to the AP device. Correspondingly, the AP device may receive the first message frame, so as to acquire the physical parameter of the non-AP device based on the first message frame.

The communication device described with reference to FIG. 7 may satisfy the demands of the IEEE 802.11be standard, thus improving the utilization efficiency of the frequency spectrum and throughput.

Based on the same principle as in the method according to the example of the disclosure, an example of the disclosure further provides an electronic device. The electronic device includes a processor and a memory, in which the memory stores a machine-readable instruction (also referred to as "a computer program"), and the processor is configured to implement the method described with reference to FIG. 6 by executing the machine-readable instruction.

An example of the disclosure further provides a computer-readable storage medium. The computer-readable storage medium stores a computer program, in which computer program implements the method described with reference to FIG. 6 when executed by a processor.

In an example, the processor may be configured to implement or execute all the illustrative logic blocks, modules, and circuits described in connection with contents of the disclosure, the processor may be a central processing unit (CPU), a general-purpose processor, a digital signal processor (DSP), an application specific integrated circuit (ASIC), a field programmable gate array (FPGA), or another programmable logic device, transistor logic device, hardware component, or any combination of them. The processor may also be a combination that implements a computation function, for example, a combination including one or more microprocessors, a combination of a DSP and a microprocessor, etc.

In an example, the memory may be, but is not limited to, for example, a read only memory (ROM), a random access memory (RAM), an electrically erasable programmable read only memory (EEPROM), a compact disc read only memory (CD-ROM), another optical disc storage, an optical disc storage device (including a compact disc, a laser disc, an optical disc, a digital versatile disc, a Blu-ray disc, etc.), a magnetic disc storage medium, another magnetic storage device, or any other medium that may be used to carry or store a program code in a structural form of an instruction or data and accessed by a computer.

It should be understood that while all steps in the flowchart of the accompanying drawing are shown sequentially as indicated by arrows, these steps are not necessarily executed sequentially in an order indicated by the arrows. Unless explicitly stated here, an execution order of these steps is not strictly limited, and these steps may be executed in other orders. In addition, at least a part of the steps in the flowchart of the accompanying drawing may include a plurality of sub-steps or stages. These sub-steps or stages are not necessarily executed at the same time, but may be executed at different times. These sub-steps or stages are not necessarily performed sequentially, but may be executed in turn or alternately with other steps or at least some of sub-steps or stages of other steps.

While the disclosure has been shown and described with reference to certain examples of the disclosure, it is to be understood by those skilled in the art that various changes in form and details can be made without departing from the scope of the disclosure. Accordingly, the scope of the disclosure should be defined by the appended claims and their equivalents instead of being limited by the examples.

What is claimed is:

1. A communication method, comprising:
   determining a first message frame by a transmission terminal, wherein the first message frame comprises information indicating a physical parameter of the transmission terminal, and the physical parameter comprises a modulation and coding scheme (MCS) set supported by N spatial streams, wherein N is a positive integer greater than 8; and
   transmitting the first message frame to a reception terminal by the transmission terminal, wherein the first message frame enables the reception terminal to acquire the physical parameter of the transmission terminal from the first message frame;
   wherein the first message frame comprises a sub-field indicating at least one of:
   receive extreme high-throughput-modulation and coding scheme (EHT-MCS) map corresponding to a bandwidth of 320 MHz;
   transmit EHT-MCS map corresponding to the bandwidth of 320 MHz;
   receive EHT-MCS map corresponding to a bandwidth of 160 MHz+160 MHz; or
   transmit EHT-MCS map corresponding to the bandwidth of 160 MHz+160 MHz.

2. The communication method according to claim 1, wherein the MCS set comprises an MCS corresponding to a modulation and coding mode of 4096-quadrature amplitude modulation (QAM).

3. The communication method according to claim 2, wherein indexes of the MCS corresponding to the modulation and coding mode of the 4096-QAM are 12 and 13.

4. The communication method according to claim 1, wherein the MCS set comprises MCS corresponding to at least one of the following modulation and coding modes:
quadrature phase shift keying (QPSK), 16-QAM, 64-QAM, 256-QAM, or 1024-QAM.

5. The communication method according to claim 4, wherein indexes of the MCS range from 0 to 11.

6. The communication method according to claim 1, wherein N equals to 16.

7. The communication method according to claim 1, wherein the MCS is an extreme high-throughput-modulation and coding scheme (EHT-MCS).

8. The communication method according to claim 7, wherein the first message frame further comprises a plurality of first sub-fields, wherein the plurality of first sub-fields identify a maximum (max) EHT-MCS set supported by n spatial streams, wherein n=1, . . . , N.

9. The communication method according to claim 8, wherein each first sub-field comprises at least three bits.

10. The communication method according to claim 8, wherein a coded value of each first sub-field represents any of the following:
a first value indicates support for EHT-MCSs 0-7 for n spatial streams;
a second value indicates support for EHT-MCSs 0-9 for n spatial streams;
a third value indicates support for EHT-MCSs 0-11 for n spatial streams;
a fourth value indicates support for EHT-MCSs 0-13 for n spatial streams; or
a fifth value indicates that n spatial streams are not supported for EHT presentation protocol data units (PPDUs).

11. The communication method according to claim 8, wherein the first message frame comprises: an extreme high-throughput operation element; and
wherein the extreme high-throughput operation element comprises the plurality of first sub-fields.

12. The communication method according to claim 11, wherein the extreme high-throughput operation element comprises an extreme high-throughput operation parameter field.

13. The communication method according to claim 12, wherein the extreme high-throughput operation parameter field comprises a first identifier configured to indicate whether a high efficiency (HE) operation parameter sub-field is present.

14. The communication method according to claim 12, wherein the extreme high-throughput operation parameter field comprises a second identifier configured to indicate whether a very high throughput (VHT) operation parameter sub-field is present.

15. The communication method according to claim 1, wherein the first message frame further comprises a sub-field indicating at least one of:
receive EHT-MCS map corresponding to a bandwidth less than or equal to 80 MHz;
transmit EHT-MCS map corresponding to the bandwidth less than or equal to 80 MHz;
receive EHT-MCS map corresponding to a bandwidth of 160 MHz;

transmit EHT-MCS map corresponding to the bandwidth of 160 MHz;
receive EHT-MCS map corresponding to a bandwidth of 80 MHz+80 MHz; or
transmit EHT-MCS map corresponding to the bandwidth of 80 MHz+80 MHz.

16. An electronic device, comprising:
a memory that stores a computer program, and
one or more processors that are communicatively coupled to the memory, and
wherein the computer program when collectively executed by the one or more processors, causes the electronic device to act as a transmission terminal and to:
determine a first message frame, wherein the first message frame comprises information indicating a physical parameter of the transmission terminal, and the physical parameter comprises a modulation and coding scheme (MCS) set supported by N spatial streams, wherein N is a positive integer greater than 8; and
transmit the first message frame to a reception terminal, wherein the first message frame enables the reception terminal to acquire the physical parameter of the transmission terminal from the first message frame;
wherein the first message frame comprises a sub-field indicating at least one of:
receive extreme high-throughput-modulation and coding scheme (EHT-MCS) map corresponding to a bandwidth of 320 MHz;
transmit EHT-MCS map corresponding to the bandwidth of 320 MHz;
receive EHT-MCS map corresponding to a bandwidth of 160 MHz+160 MHz; or
transmit EHT-MCS map corresponding to the bandwidth of 160 MHz+160 MHz.

17. A non-transitory computer-readable storage medium, storing a computer program, wherein the computer program, when executed by one or more processors of a transmission terminal, causes the transmission terminal to perform a method comprising:
determining a first message frame, wherein the first message frame comprises information indicating a physical parameter of the transmission terminal, and the physical parameter comprises a modulation and coding scheme (MCS) set supported by N spatial streams, wherein N is a positive integer greater than 8; and
transmitting the first message frame to a reception terminal, wherein the first message frame enables the reception terminal to acquire the physical parameter of the transmission terminal from the first message frame;
wherein the first message frame comprises a sub-field indicating at least one of:
receive extreme high-throughput-modulation and coding scheme (EHT-MCS) map corresponding to a bandwidth of 320 MHz;
transmit EHT-MCS map corresponding to the bandwidth of 320 MHz;
receive EHT-MCS map corresponding to a bandwidth of 160 MHz+160 MHz; or
transmit EHT-MCS map corresponding to the bandwidth of 160 MHz+160 MHz.

* * * * *